US009143612B2

(12) United States Patent
Roncoroni et al.

(10) Patent No.: US 9,143,612 B2
(45) Date of Patent: Sep. 22, 2015

(54) CENTRALIZED CALLER PROFILE SYSTEM AND METHODS FOR ROUTING AND PRIORITIZING CALLS

(71) Applicants: Ian James Roncoroni, Phillipsburg, NJ (US); Gianni Martire, Englewood Cliffs, NJ (US)

(72) Inventors: Ian James Roncoroni, Phillipsburg, NJ (US); Gianni Martire, Englewood Cliffs, NJ (US)

( * ) Notice: Subject to any disclaimer, the term of this patent is extended or adjusted under 35 U.S.C. 154(b) by 0 days.

(21) Appl. No.: 14/069,991

(22) Filed: Nov. 1, 2013

(65) Prior Publication Data

US 2015/0124949 A1    May 7, 2015

(51) Int. Cl.
*H04M 1/56* (2006.01)
*H04M 15/06* (2006.01)
*H04M 3/42* (2006.01)

(52) U.S. Cl.
CPC ................ *H04M 3/42059* (2013.01)

(58) Field of Classification Search
CPC .................. H04M 1/274516; H04M 3/42059; H04M 3/5133; H04M 3/5231; H04M 3/5235
USPC ............. 379/142.01, 142.04, 142.06, 142.15, 379/265.01, 265.09, 265.11, 266.01, 266.1
See application file for complete search history.

(56) References Cited

U.S. PATENT DOCUMENTS

| | | | |
|---|---|---|---|
| 6,459,782 B1 * | 10/2002 | Bedrosian et al. | 379/201.08 |
| 6,721,406 B1 * | 4/2004 | Contractor | 379/142.06 |
| 8,139,753 B2 * | 3/2012 | Pickering et al. | 379/265.02 |
| 2004/0196966 A1 | 10/2004 | Bushnell | |
| 2005/0195962 A1 * | 9/2005 | Brown | 379/265.02 |
| 2009/0265327 A1 | 10/2009 | Zou | |
| 2011/0013755 A1 * | 1/2011 | Martino et al. | 379/88.2 |
| 2011/0158392 A1 * | 6/2011 | DeLuca | 379/88.18 |
| 2011/0293078 A1 * | 12/2011 | Saylor et al. | 379/88.13 |
| 2014/0112457 A1 * | 4/2014 | Xing et al. | 379/32.01 |
| 2014/0112463 A1 * | 4/2014 | Ghesquiere et al. | 379/142.04 |

FOREIGN PATENT DOCUMENTS

| | | |
|---|---|---|
| CA | 2139111 C | 4/1998 |
| CA | 2232319 C | 5/2001 |
| WO | 9835509 A3 | 11/1998 |
| WO | 2006127302 A1 | 11/2006 |
| WO | 2008042531 A3 | 7/2008 |

* cited by examiner

*Primary Examiner* — Quoc D Tran

(57) ABSTRACT

Disclosed is a Centralized Caller Profile System and methods for routing and prioritizing calls. The disclosed systems and methods provide enhanced customer service by allowing multiple parties to update and share the same set of profile information from a centralized database. The disclosed systems and methods provide for faster, easier access to profile information, more efficient call routing, and the ability to prioritize callers in a caller queue.

20 Claims, 6 Drawing Sheets

CENTRALIZED CALLER PROFILE SYSTEM AND METHODS FOR ROUTING AND PRIORITIZING CALLS

CROSS REFERENCE TO RELATED APPLICATIONS

This application claims the benefit of U.S. Provisional Patent Application No. 61/724,100, filed on Nov. 2, 2012 and U.S. Provisional Patent Application No. 61/722,005, filed on Nov. 2, 2012.

BACKGROUND

The first prototype of modern Caller ID was developed in 1971 by Theodore Paraskevakos. In patents related to those devices, he proposed to send alphanumeric information to the receiving apparatus, and this was received with great success. His invention was improved by Japanese inventor Kazuo Hashimoto, who in 1976 built a prototype of a Caller ID display device that could receive Caller ID information. The first market trial for Caller ID was conducted by BellSouth in 1984. Since 1984, there has been very little innovation to traditional caller ID. In 1995, call waiting ID was introduced by Bellcore, but this only allowed caller ID to be transmitted while the user was simultaneously on the phone; it did not make any improvement to traditional caller ID.

Rising popularity of cellular phones is actually making caller ID increasingly obsolete; most networks do not support the necessary infrastructure to support the transmission of this data. For this reason, carriers report the name as "unavailable" or "wireless caller." In 2002, mobile users surpassed landline subscribers, and in 2013, cell phones outnumber landlines 5:1.

Regardless of the platform or carrier, Caller ID suffers from at least one significant disadvantage: the technology provides only the caller's number and name to the called party. There exists a need to better identify callers and provide better information about those callers. Before this disclosure, no technology provided a method of rapidly identifying callers and providing profile information to the called party or its agents. Before this disclosure, no technology provided a way to automatically identify a caller and intelligently transfer that caller to an appropriate call designation or agent. Lastly, before this disclosure, no technology provided a means for prioritizing a caller in a call queue pursuant to that caller's subscribing to a particular efficiency system or service.

BRIEF DESCRIPTION OF THE DRAWINGS

FIG. 3 shows the following transmitting/acquiring aspects: from the Caller to the Called Party (2); from the Called Party to the Caller (3); from the Called Party to a Database (5); from the Database to the Called Party (6); from the Database to the Agent (8); from the Agent to the Database (9); from the Called Party to the Agent (10); from the Agent to the Database (11).

In FIG. 4, parts (10), (13), and (10a) take the place of the arrow labeled (10) in FIG. 3, thereby providing additional detail in this example. The vertical lines represent positions in the Caller Queue. FIG. 4 shows a traditional Caller Queue, where Callers are connected with Agents in the order that they are transferred from the Called Party. The arrow (10a) shows how Callers in the FIG. 4 example are transferred from the front (right most) position in the Caller Queue to the Agent (12). FIG. 4 shows a first-in-first-out ("FIFO") Caller Queue.

In FIG. 5, the Called Party (4) transfers (10) the Caller to the front, "next caller" position of Caller Queue (13), where the Caller is transferred (10a) to the next available Agent (12).

DETAILED DESCRIPTION

Figure 1:
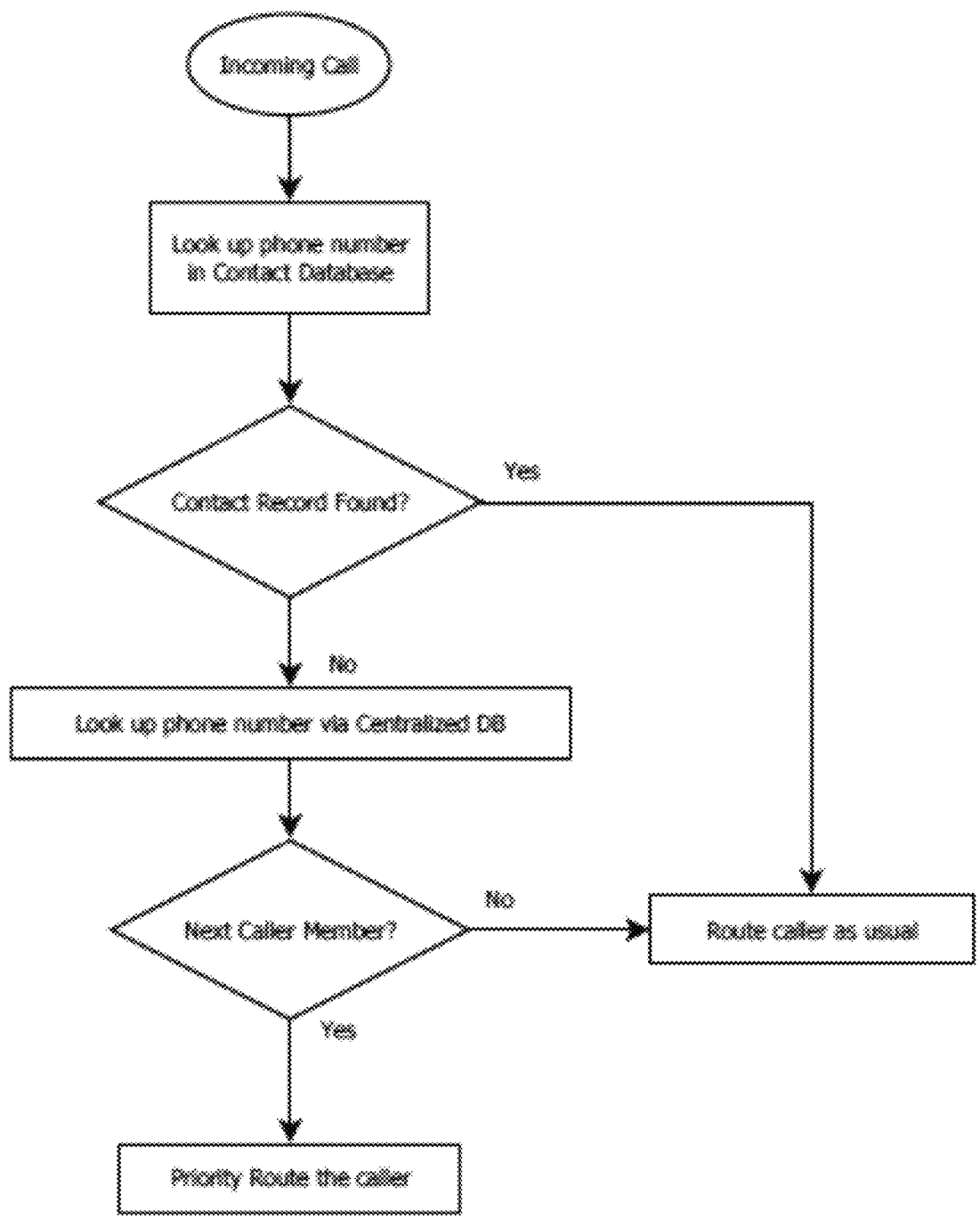
FIG. 1 shows one example of the process flow for the disclosed methods of prioritizing calls by using a flow chart. The process flow begins at the top of the page and continues to one of the termini at the bottom of the page.
Figure 2:
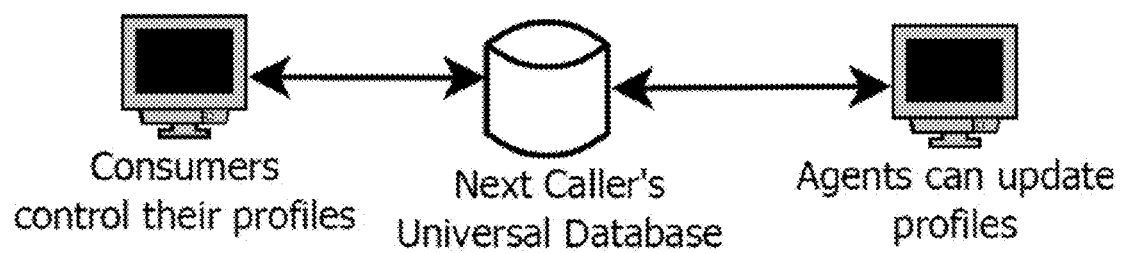
FIG. 2 shows the universal database aspect of the disclosed methods and systems. The figure shows systems and methods utilizing a Cloud Database for storing and updating profile information. As indicated in FIG. 2, both consumers (e.g., Callers) and Agents or third parties can amend the information stored on the Universal Cloud Database.
Figure 3:
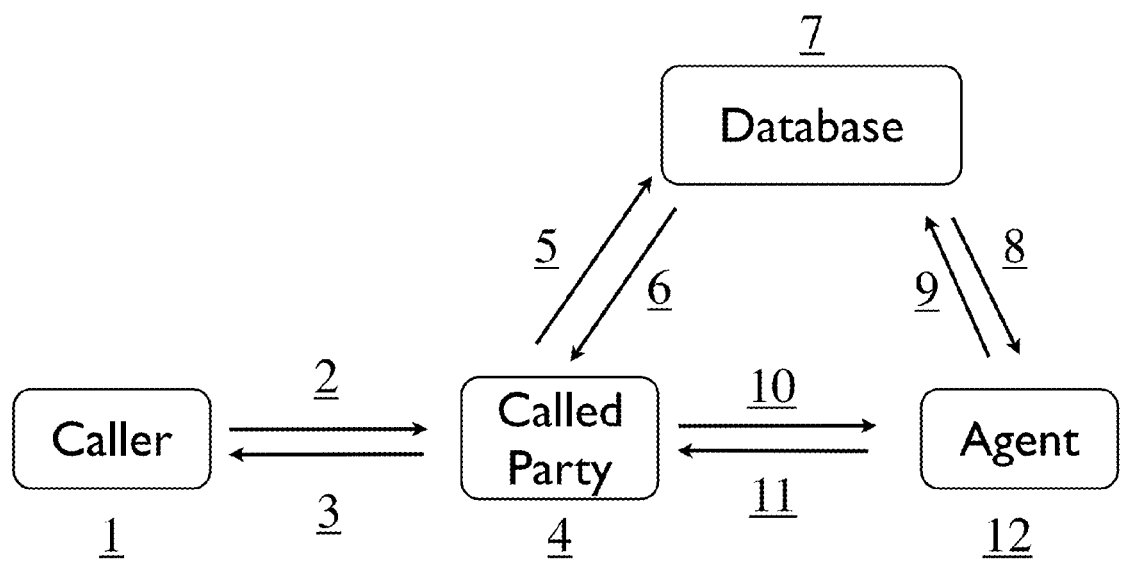
FIG. 3 shows a Centralized Caller Profile System comprising a Caller (1), a Called Party (4), a Database (7), and an Agent (12). The arrows in FIG. 3 show the interconnectivity of these entities by representing the transfer (aka transmitting) and/or acquiring of data or real-time connectivity.
Figure 4:
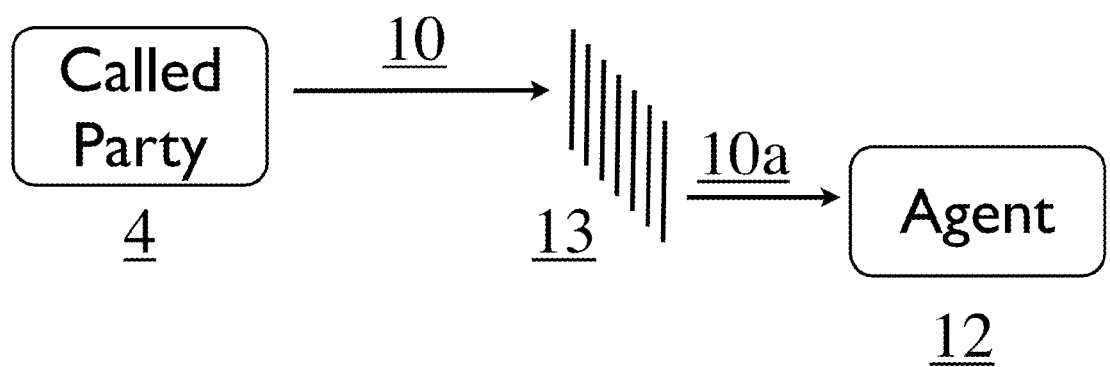
FIG. 4 shows transfer of a call via an exemplary Caller Queue (13).
Figure 5:
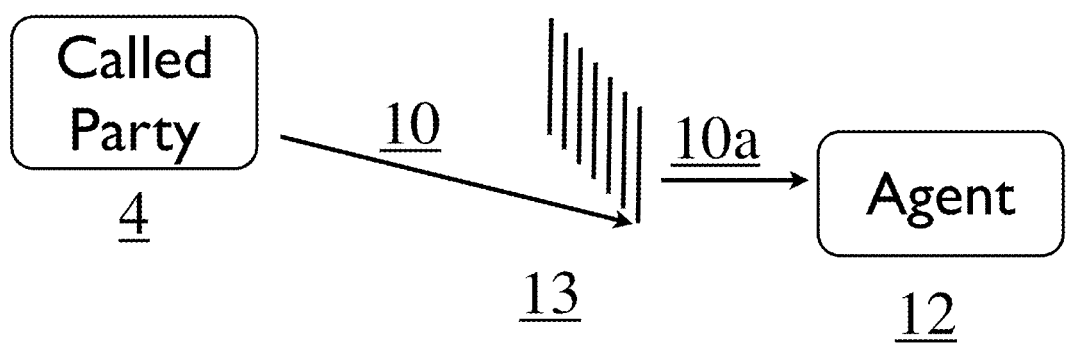
FIG. 5 shows priority routing of a Caller.
Figure 6:
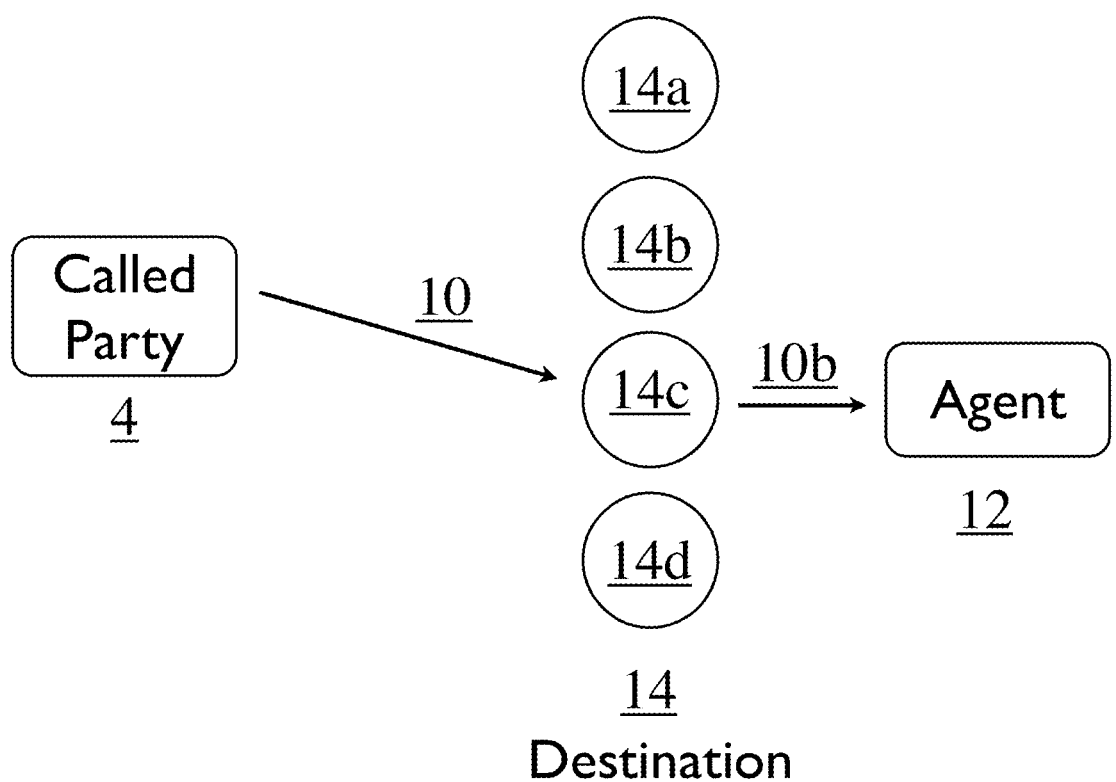
FIG. 6 shows part of a Call Routing System having a plurality of Destinations (14a)(14b)(14c)(14d), or collectively (14). As shown in the FIG. 6 example, a Called Party (4) transfers (10) a Caller to a particular Destination, here (14c), consisting of Agents sharing a chosen characteristic. The Caller is then transferred (10b) to an Agent (12) characterized by that Destination.

Described herein is a system and method for looking up Content, such as profile information, about callers. The disclosed centralized caller profile system for authenticating and identifying callers is an improvement beyond existing systems and methods because it eliminates the need for hardware, and allows multiple parties to access the same set of information from a centralized database. In one embodiment, the centralized database is maintained by an outside system, such as a Cloud Database. This new method is far less costly and more efficient than previous systems.

The system and methods disclosed herein provide a caller profile system and service that enable third parties the ability to rapidly identify a caller via a centralized caller profile database. A caller profile may contain any type of Content, including text, image, or other form of multimedia content. The profiles are maintained by the users who created them to establish the profiles that are delivered to called parties with the delivery of each call, and/or at the request of the user.

The Content (e.g., caller profile information) may be stored in a Caller Profile Database operated by a service provider, but may also be stored in a corporate or user operated Caller Profile database. However stored, the Content may be created and revised by the user, as needed, using a network terminal, such as a computer-based World Wide Web browsing system, or an interactive voice response system. The updates are registered and stored in the database, and can be sent at the users' discretion to third parties.

Third parties are able to access a caller associated Content (e.g., the caller's profile information) using the caller's Unique Identifier, which can be a telephone number, email address, or other identifier unique to the Caller. This profile can be used by third parties in any way that is helpful to that party and its business, or in any way the information is important to the relationship between the user and the party.

Automatically identifying the Caller and providing the service provider with information about the Caller adds value to the user by making the exchange of personal data over the phone faster and more efficient. The Caller no longer has to verbally exchange this information, and risk miscommunication with the answering agent. The third party accessing this information benefits from the disclosed system and methods by saving valuable agent time in gathering this necessary information. Normally, their businesses also save time and money by having up to date customer information which reduces errors in shipping, billing, etc.

In one sense, the centralized caller profile system for authenticating and identifying callers is an efficiency mechanism that simplifies and expedites the exchange of personal information from users to third parties. The system achieves this efficiency by using a Cloud Database, e.g., housing, utilizing, and distributing profile information contained in a database to any third party having permission. The profiles contained in the database are created, modified, maintained, and distributed by the user, or by a third party at the request of the user.

A profile may contain any type of Content, such as text, image or other form of multimedia content. The user may also permit the profile to be stored in a corporate, public, or user operated Caller Profile Database. By giving a third party permission to view or access the profile, the third party more rapidly, and with a greater level of accuracy, can identify the user.

The profile identifier (e.g., the Caller's Unique Identifier or a unique record locator), used to select which profile to view, can be sent via telephone call, electronic message, or any other method by which the user can communicate directly or indirectly with the third party.

The systems and methods described herein provide the advantage of better call routing, such as prioritizing a particular Caller or routing the Caller to a particular Call Destination. In one embodiment, the priority call queue method marks a particular caller in the call queue as 'high priority.' This heightened priory level signals the call center to bump the call with the high priority mark ahead of the other callers on the call queue. This method is designed to enhance the customer service experience for callers that are labeled as 'high priority.' Prior to this disclosure, callers on a call queue were treated similarly. Conventionally, callers were served on a first-come-first-serve basis, i.e., they were sorted on a First-In-First-Out basis. With the disclosed new method, high priority callers are pushed ahead on the call queue. This provides high priority callers with higher level of customer service and satisfaction.

This disclosure allows high priority callers on a call queue to be more quickly assisted by an answering agent. The high priority callers are determined by the call center or a third party application. Once those callers have been identified, the system marks the caller as "high priority" and those callers are bumped ahead in the call queue. As a result, high priority callers will receive expedited assistance from an answering agent. There can be multiple high priority callers on a call queue; each high priority caller is handled in the order they are received.

In one embodiment, Callers in a Caller Queue are identified by their respective phone numbers. The high priority callers are determined by a Called Party, e.g., the call center or a third party application. "High priority" status can be determined by the call center or third party application using any method the call center or third party application chooses. Once those callers have been identified, a system marks those callers as "high priority" and those callers are moved ahead in the Call Queue.

FIG. 1 details one example of the process flow for the disclosed methods of prioritizing calls. As a result, high priority callers receive expedited assistance from an answering agent. In one embodiment, in which there are multiple high priority callers on a queue, each caller is handled in the order they are received. The priority call queue method is designed to enhance the customer support experience when calling a call center. Assisting high priority callers before other callers helps businesses enhance their relationships with high priority customers and provide a personalized call center experience.

The priority call queue method can be utilized by any call center or third party application to deliver a personalized, enhanced call center experience to users identified as "high priority." High priority callers in a Caller Queue are able to receive the benefit of expedited customer attention as exemplified in FIG. 1.

Disclosed herein is a Centralized Caller Profile System, routing system, and methods of routing and prioritizing callers.

This disclosure provides a Centralized Caller Profile System comprising:
 a Caller;
 a Called Party;
 a Cloud Database;
 a telephone connection between the Caller and the Called Party;
 the Called Party retrieving a Unique Identifier from the Calling Party;
 the Called Party transmitting the Unique Identifier to the Cloud Database; and
 the Cloud Database transmitting Content to the Called Party.

As used herein, the term "Caller" means a calling party, i.e., the party placing or initiating a call, especially a telephone call, to a Called Party.

As used herein, the term "Called Party" means a party receiving a call from a Caller.

In a simple example, a "Caller" places a telephone call to a Called Party by dialing the Called Party's number and waiting for the Called Party to answer the call. This simple example may also include one or more intermediaries, who transfer the Caller to one or more call recipients, who answer the call.

As used herein, the term "Cloud Database" means a database that typically runs on a cloud computing platform. The term "cloud computing" describes a variety of computing concepts that involve a large number of computers connected through a real-time communication network's such as the Internet. In one sense, cloud computing is a synonym for distributed computing over a network and means the ability to run a program on many connected computers at the same time. The term cloud computing is also commonly used to refer to network-based services which appear to be provided by real server hardware, which in fact are served up by virtual hardware, simulated by software running on one or more real machines. Such virtual servers do not physically exist and can therefore be moved around and scaled up (or down) on the fly without affecting the end user.

Examples of popular cloud computing platforms include Amazon EC2, GoGrid and Rackspace, which can be utilized by those having ordinary skill in the art. There are two common deployment models: users can run databases on the cloud independently, using a virtual machine image, or they can purchase access to a database service, maintained by a cloud database provider. Of the databases available on the cloud, some are SQL-based and some use a NoSQL data model.

As used herein, the term "telephone connection" means a live connection between 2 or more parties, wherein at least one party is connected via a telephone. For example, a telephone conversation between two participants would include a telephone connection, through which the those participants converse.

As used herein, the term "retrieving" means actively requesting or accepting available information from a party to a particular connection. For example, during a telephone call, the Called Party may use known methods (e.g., Caller ID) of retrieving the telephone number of a Caller.

As used herein, the term "Unique Identifier" means a piece of information sufficient to specify one thing or record amidst a larger number of possibilities. Examples of a Unique Identifier include the following: sequence of numbers, letters, or symbols, which is used to identify one specific entity. Within the context of a database (e.g., a Cloud Database), a Unique Identifier is unique among all identifiers used for those objects and for a specific purpose. In one embodiment, a Unique Identifier is a Caller ID (caller identification, CID), aka, calling line identification (CLID), calling number delivery (CND), calling number identification (CNID), or calling line identification presentation (CLIP). In another embodiment, a Unique Identifier is a mobile identification number (MIN) or mobile subscription identification number (MSIN). Within the context of this disclosure, the Unique Identifier can be any reliable identification feature provided by the Caller and retrievable by the Called Party.

The Unique Identifier acquired by the Called Party from the Calling Party may be used as a record locator in the Cloud Database. But, the Cloud Database need not use the Unique Identifier as a unique record locator in the cloud database. To the contrary, the Unique Identifier initially acquired from the Caller may be converted into a different, easier to use identifier on the Cloud Database. One advantage of converting the Unique Identifier initially acquired from the Caller into a different record locator is avoiding problems with duplicate numbers when handling international callers.

As used herein, the term "transmitting" means causing data or a signal to pass on from one location or person to another. The term "transmitting" should also be understood to mean broadcasting or sending out, such as an electrical signal, a digital signal, an audio signal, or a radio signal. In one embodiment, transmitting means sending a Unique Identifier to a Cloud Database via an internet connection. For example, a Called Party can perform a Caller ID lookup for an incoming Caller, transmitting that telephone number information to the Cloud Database.

As used herein, the term "Content" means textual, visual or aural content. Content may include, among other things, text, images, sounds, videos and animations. In one embodiment, Content is profile information. In one embodiment, the Content is chosen from text, images, and video.

As used herein, the term "text" should be construed to mean characters, including all alphanumeric characters and languages.

In one embodiment, the Content is chosen from profile information and billing information.

As used herein, the term "profile information" means textual, image, sound, video, or animated representations about a particular entity, e.g., a human being. For example, profile information, including textual information such as name, address, employment, spoken language, buying preferences, age, hobbies, etc. Profile information also includes information typically found on social media or business networking sites, such as, for example, LinkedIn or Facebook.

As used herein, the term "billing information" means name, address, and other information required to complete a sales transaction. In one embodiment, billing information includes information chosen from credit card number, credit card verification code, checking account, bank routing number, credit rating, etc.

In one embodiment, the Centralized Caller Profile System comprises an Agent. As used herein, the term "Agent" means an intelligent entity with whom a Caller can interact or converse, e.g., about particular goods or services. In one embodiment, the intelligent entity is an intelligent entity answering the telephone call and engaging the Caller in conversation. In one embodiment, an Agent is a human customer service representative. In one example, the term "Agent" includes a person answering telephone calls within the customer service department of a business.

In one embodiment of the disclosed Centralized Caller Profile System, the Agent could be replaced with a non-human entity, such as an interactive voice response ("IVR") system.

In one embodiment of the disclosure, the Centralized Caller Profile System comprises transmitting Content from the Called Party to the Agent.

In one embodiment of the disclosure, the Centralized Caller Profile System comprises transmitting audio from the Caller to the Agent. As used herein, the term audio means sound, such as spoken language. In one embodiment of this disclosure, "transmitting audio from the Caller to the Agent" includes the Caller speaking into a telephone and sending the spoken words to the Agent, via a telephone call.

In one embodiment, the Centralized Caller Profile System comprises transmitting audio from the Agent to the Caller.

In one embodiment, the Centralized Caller Profile System comprises a telephone connection between the Caller and the Agent.

In one embodiment of the disclosure, the Centralized Caller Profile System comprises transmitting Amended Content from the Agent to the Cloud Database. In one embodiment, the Centralized Caller Profile System comprises transmitting Amended Content from the Caller to the Cloud Database.

The term "Amended Content" refers to revised Content that differs from a previous version stored and associated with a particular record. E.g., address, billing information, customer preferences, etc. For a specific database record, the Content associated with a specific user may be changed by a remote user (e.g., the Agent or the Caller) of the Centralized Caller Profile System. To update the specific database record, the remote user would send Amended Content to the database, asking the database to change the then-existing content to the new Amended Content, updating the Content stored in the database.

The term "record" means a group of related data, words, or fields treated as a meaningful unit. For example data, words, or fields can be grouped together by associating them with a common Unique Identifier.

Disclosed herein are methods of providing a Caller Profile to an Agent, comprising:
  establishing a telephone connection between Called Party and a Caller;
  acquiring a Unique Identifier from the Caller;
  transmitting the Unique Identifier to a Cloud Based Database;
  querying the Cloud Based Database for a record corresponding to the Unique Identifier;
  identifying Content associated with the Unique Identifier; and
  transmitting the Content associated with the Unique Identifier to the Called Party.

The term "Caller Profile" means a particular representation of personal information associated with a particular person or entity. In one embodiment, a Caller Profile comprises the name, address, telephone number, and email address for a particular person.

The term "establishing" means setting up, making, or creating anew. Establishing a telephone connection between a Called Party and a Caller could be accomplished by the Called Party's receiving and answering an incoming telephone call from a Caller. From the standpoint of a Caller, establishing a telephone conversation could be accomplished by placing a telephone call to an entity known to answer telephone calls and waiting for the receiving party to answer the telephone. In another example, a Caller requests that the Called Party establishes a telephone connection.

The term "acquiring" means gaining, getting, or receiving. In one example, acquiring the Unique Identifier from a Caller is accomplished by reading the Caller ID information transmitted by the Caller.

The term "querying" means searching for a particular text, image, sound, video or animation. The term "identifying" means finding that particular text, image, sound, video or animation upon searching for it.

The term "corresponding" means associated or grouped together with a particular thing. Content corresponding to a particular Unique Identifier would all be associated with (e.g., tagged, marked, designated) that Unique Identifier, such that querying for the Unique Identifier would reciprocally return that Content.

In one embodiment, the method of providing a Caller Profile to an Agent comprises transmitting Content associated with a Caller's Unique Identifier to an Agent.

In one embodiment, the method of providing a Caller Profile to an Agent comprises establishing a telephone connection between the Caller and the Agent.

In one embodiment, the method of providing a Caller Profile to an Agent comprises acquiring the telephone number of the Caller.

In one embodiment, the method of providing a Caller Profile to an Agent comprises transmitting the telephone number of the Caller to the Cloud Database.

In one embodiment, the method of providing a Caller Profile to an Agent comprises querying the Cloud Based Database for a record corresponding to the telephone number of the Caller.

In one embodiment, the method of providing a Caller Profile to an Agent comprises transmitting audio from the Caller to the Agent. Transmitting audio from the Caller to the Agent includes, for example, the Caller speaking to the Agent over the telephone.

The term "audio" means sound or an electrical or other representation of sound. Sound may be stored and transmitted in a variety of ways, including digital or audio.

In one embodiment, the method of providing a Caller Profile to an Agent comprises transmitting audio from the Agent to the Caller.

In one embodiment, the method of providing a Caller Profile to an Agent comprises amending the Content associated with the Unique Identifier.

The term "amending Content" means changing or modifying Content. The changing of modifying may include adding new Content, deleting all or some of the Content, or altering it in any way. In one embodiment, the amending is performed by an entity chosen from the Caller and the Agent.

Disclosed herein is a Priority Caller Queue System, comprising:
 a Caller;
 a Called Party;
 a Caller Queue;
 an Agent;
 a transfer of the Caller from the Called Party to the Caller Queue for the Agent;
 a preferential positioning of the Caller in the Caller Queue.

The term "Caller Queue" means a waiting line of Callers. The term "Caller Queue for the Agent" means the waiting line of Callers assigned to that particular Agent. The term "preferential positioning" refers to placing a Caller in a Caller Queue at a position other than the end of the line. The Caller can be preferentially positioned based on a high or heightened priority status marker.

Conventional caller queues employ first-in-first-out ("FIFO") waiting lines for callers. In such FIFO waiting lines, the waiting callers are serviced in the order that the call is received. "Preferential positioning" refers to placing a Caller in a Caller Queue ahead of other callers who may have entered the Caller Queue earlier in time. For example, the Caller may be bumped or pushed ahead in the Caller Queue based on the Caller's priority status.

The term "transfer of the Caller" refers to the act of directing a particular call or Caller to a Destination or Agent. For example, a Called Party, such as a receptionist, switchboard, or call center may transfer or direct a Caller to a Destination having customer service agents of a particular skill or spoken language. The transfer of the Caller may also direct the Caller to a specific Agent.

The term "Destination" means a genre of Agent types, in which each Agent shares a particular characteristic. For example, a Destination (including multiple Agents) may be defined by spoken language, technical expertise, or any other shared characteristic, defining the genus of Agents. An Agent refers to a specific person who may (or may not) share a Destination with other agents.

In one embodiment of the Priority Caller Queue System, the Called Party acquires a Unique Identifier from the Caller.

In one embodiment of the Priority Caller Queue System, the Called Party transmits the Unique Identifier to a Cloud Database.

In one embodiment of the Priority Caller Queue System, the Called Party receives status information about the Caller from the Cloud Database.

The term "status information" means information about a Caller's priority within a Caller Queue. As discussed above, certain Callers in the Priority Caller Queue System are marked as high priority callers, causing the system to bump them ahead in the Caller Queue.

In one embodiment of the Priority Caller Queue System, the preferential positioning comprises placing the Caller in the Caller Queue at a higher priority than the last position in the Caller Queue at the time of the transfer. For a high status Caller, the preferential positioning results in less time waiting in a caller line, a faster connection time to the Agent, and expedited customer service.

In one embodiment of the Priority Caller Queue System, the preferential positioning comprises placing the Caller in a Caller Queue at a higher priority than 50% of the callers in the Caller Queue at the time of the transfer.

In one embodiment of the Priority Caller Queue System, the preferential positioning comprises placing the Caller in a Caller Queue at a position in line selected from next caller, second caller, or third caller.

The term "next caller" means the Caller in a Caller Queue designated to receive service from the next available Agent. Disclosed herein are methods of prioritizing a telephone call, comprising:

receiving a telephone call from a Caller;
acquiring a Unique Identifier from the Caller;
transferring the Caller to an Agent;
preferentially positioning the Caller in a Caller Queue.

In one embodiment, the method of prioritizing a telephone call comprises transmitting the Unique Identifier of the Caller to a Cloud Database.

In one embodiment, the method of prioritizing a telephone call comprises receiving Content from a Cloud Database.

In one embodiment, the method of prioritizing a telephone call comprises receiving Content stored in the Cloud Database and correlated with the Unique Identifier.

In one embodiment, the method of prioritizing a telephone call comprises preferentially positioning the Caller at the front 50% of the Caller Queue. The term "front 50%" means closer in line to the Agent than 50% of the other Callers in the Caller Queue.

In one embodiment, the method of prioritizing a telephone call comprises preferentially positioning the Caller at the front 75% of the Caller Queue. The term "front 75%" means closer in line to the Agent than 75% of the other Callers in the Caller Queue.

In one embodiment, the method of prioritizing a telephone call comprises preferentially positioning the Caller as the next caller in the Caller Queue.

Disclosed herein is a Call Routing System, comprising:
a Caller;
a Called Party;
a plurality of Call Destinations;
the Called Party acquiring a Unique Identifier from the Caller;
the Called Party directing the Caller to a specific Call Destination.

The term "plurality of Call Destinations" means more than one available channel for routing a particular caller. For example, a Called Party may route a Caller to one of several different call Destinations based on the spoken language of the Caller. In this example, all Agents at the Destination would speak the same language.

The term "specific Call Destination" means a Destination comprising one or more agents sharing a common characteristic. The shared common characteristic of the Agents within a specific Call Destination defines the "specific Call Destination." For example, a hypothetical Call Destination of "Spanish Speaking Agents."

In one embodiment, the Call Routing System comprises a Cloud Database.

In one embodiment, the Call Routing System comprises the transfer of Content from the Cloud Database to the Called Party.

In one embodiment, the Call Routing System comprises Content chosen from memorialized representations chosen from the following: (a) language information; (b) name; (c) address; (d) billing information; (e) fraud risk; (f) purchasing data; (g) profile information; (h) subscription information, or (i) other.

In one embodiment, the Call Routing System comprises the transfer of the Unique Identifier from the Called Party to the Cloud Based Database.

In one embodiment, the Call Routing System comprises a transfer of the Caller to a specific Agent.

Disclosed herein are methods of routing telephone calls, comprising
receiving a telephone call from a Caller;
acquiring a Unique Identifier from the Caller;
transferring the Caller to a specific Call Destination.

In one embodiment, the method of routing telephone calls, comprises transmitting the Unique Identifier to a Cloud Database.

In one embodiment, the method of routing telephone calls, comprises receiving Content from a Cloud Database.

In one embodiment, the method of routing telephone calls, comprises transferring the Caller to a specific Call Destination pursuant to instructions stored in the Cloud Database.

In one embodiment, the method of routing telephone calls, comprises transferring the Caller to an Agent.

In one embodiment, the method of routing telephone calls, comprises transferring the Caller to a specific Call Destination pursuant to instructions for choosing a spoken language for the Agent.

In one embodiment, the method of routing telephone calls, comprises transferring the Caller to a specific Call Destination pursuant to instructions for choosing a specific Call Destination.

We claim:

1. A Centralized Caller Profile System comprising:
a Caller;
a Called Party;
a Cloud Database, connected to the internet;
a telephone connection between the Caller and the Called Party;
the Called Party retrieving a Unique Identifier from the Caller;
the Called Party transmitting the Unique Identifier to the Cloud Database; and
the Cloud Database transmitting Content to the Called Party;
wherein the Cloud Database is maintained by each of a service provider, a user, and a third party; and
wherein updated Content is registered and stored in the Cloud Database.

2. The Centralized Caller Profile System of claim 1, comprising an Agent.

3. The Centralized Caller Profile System of claim 2, comprising transmitting Content from the Called Party to the Agent.

4. The Centralized Caller Profile System of claim 2, comprising transmitting analog data from the Caller to the Agent.

5. The Centralized Caller Profile System of claim 4, comprising transmitting analog data from the Agent to the Caller.

6. The Centralized Caller Profile System of claim 2, comprising transmitting Amended Content from the Agent to the Cloud Database.

7. The Centralized Caller Profile System of claim 1, comprising transmitting Amended Content from the Caller to the Cloud Database.

8. The Centralized Caller Profile System of claim 1, wherein the Content is chosen from text, images, and video.

9. The Centralized Caller Profile System of claim 1, wherein the Content is chosen from profile information and billing information.

10. The Centralized Caller Profile System of claim 2, comprising a telephone connection between the Caller and the Agent.

11. A method of providing a Caller Profile to an Agent, comprising:
establishing a telephone connection between Called Party and a Caller;

acquiring a Unique Identifier from the Caller;

transmitting the Unique Identifier to a Cloud Based Database, connected to the internet;

querying the Cloud Based Database for a record corresponding to the Unique Identifier;

identifying Content associated with the Unique Identifier;

transmitting the Content associated with the Unique Identifier to the Called Party;

wherein the Cloud Database is maintained by each of a service provider, a user, and a third party; and wherein updated Content is registered and stored in the Cloud Database.

12. The method of claim 11, comprising transmitting the Content associated with the Unique Identifier to an Agent.

13. The method of claim 11, comprising establishing a telephone connection between the Caller and the Agent.

14. The method of claim 11, comprising acquiring the telephone number of the Caller.

15. The method of claim 14, comprising transmitting the telephone number of the Caller to the Cloud Database.

16. The method of claim 15, comprising querying the Cloud Based Database for a record corresponding to the telephone number of the Caller.

17. The method of claim 11, comprising transmitting analog data from the Caller to the Agent.

18. The method of claim 11, comprising transmitting analog data from the Agent to the Caller.

19. The method of claim 11, comprising amending the Content associated with the Unique Identifier.

20. The method of claim 19, wherein the amending is performed by a database user chosen from the Caller and the Agent.

* * * * *